C. BARNES.

C. PARKER, Assignee.

VISES.

No. 7,343. Reissued Oct. 10, 1876.

WITNESSES

J. H. Shumway

Clara Broughton

Chas Parker, assignee of Chas Barnes Inventor

By Atty.

John E. Earle

JAMES R. OSGOOD & CO BOSTON

UNITED STATES PATENT OFFICE.

CHARLES BARNES, OF CINCINNATI, OHIO, ASSIGNOR TO CHARLES PARKER, OF MERIDEN, CONNECTICUT.

IMPROVEMENT IN VISES.

Specification forming part of Letters Patent No. 76,584, dated April 14, 1868; reissue No. 7,343, dated October 10, 1876; application filed September 23, 1876.

*To all whom it may concern:*

Be it known that I, CHARLES BARNES, of Cincinnati, in the county of Hamilton and State of Ohio, have invented a new Improvement in Vises; and I do hereby declare the following, when taken in connection with the accompanying drawings and the letters of reference marked thereon, to be a full, clear, and exact description of the same, and which said drawings constitute part of this specification, and represent, in—

Figure 1:
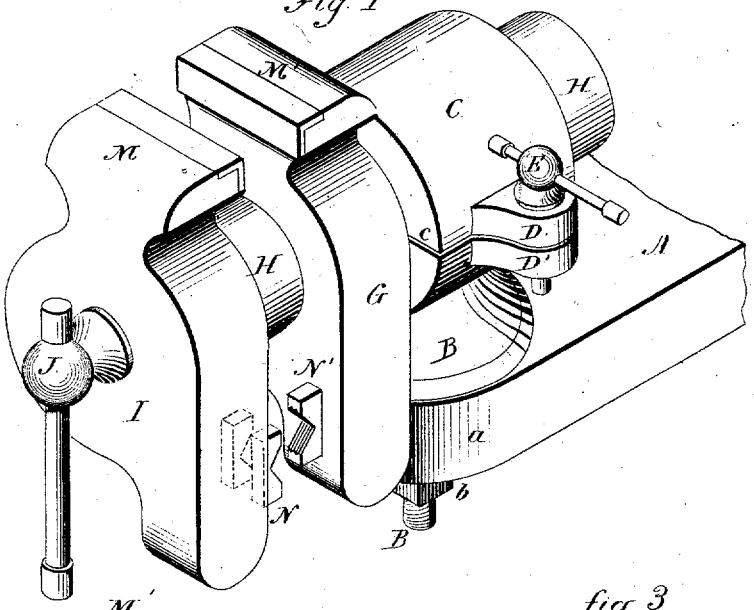
Figure 2:
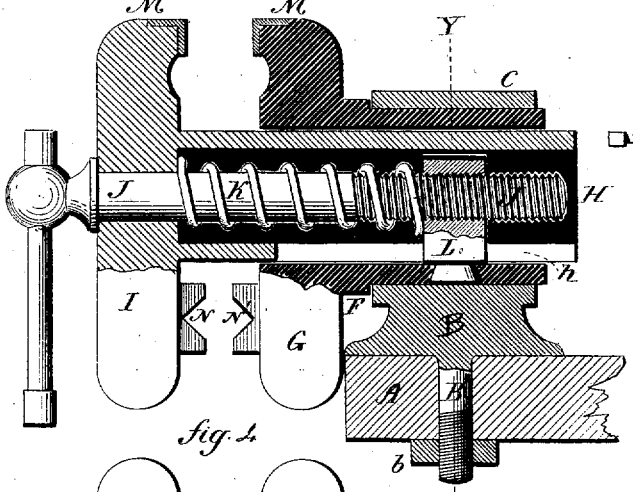
Figure 3:
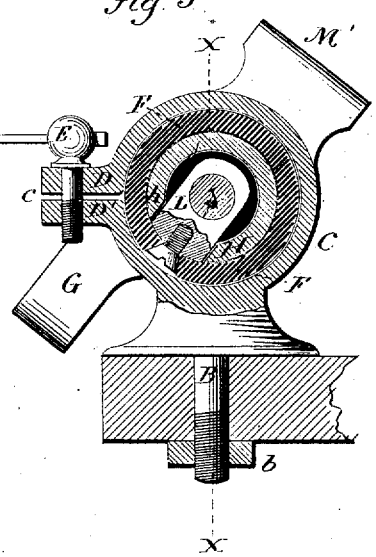
Figure 4:
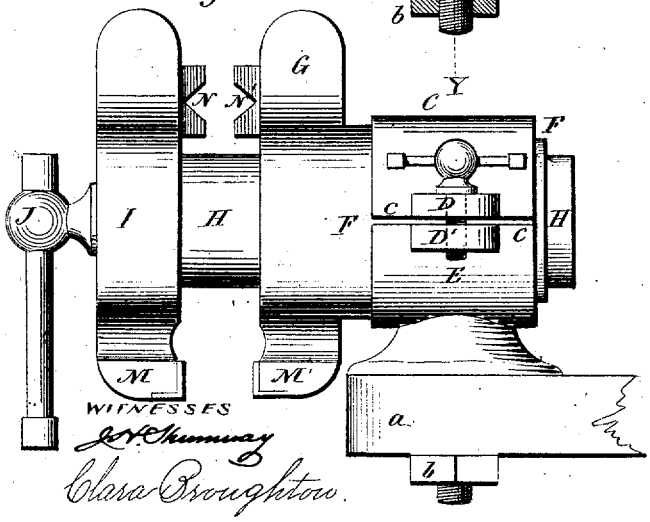

Figure 1, a perspective view of a bench-vise embodying my invention; Fig. 2, an axial section of the same in the line *x x* of Fig. 3; Fig. 3, an axial section in the line *y y* of Fig. 2; and in Fig. 4, a side elevation thereof.

This invention relates to an improvement in what are termed "bench-vises"—that is to say, vises the jaws of which come above the bench; the object of the invention being to adapt this class of vises to hold a variety of objects, and so as to be adjusted to different positions, vertically or horizontally.

The invention consists, first, in making the jaws adjustable around a horizontal axis, of which the screw is substantially the center; and, secondly, in making such a vise also adjustable around a vertical axis.

In the illustration there is shown a vise adjustable both upon a horizontal and vertical axis.

A represents a portion of a bench having a rounded edge, *a*, to permit of any desired horizontal vibration of the vise, and being traversed vertically by the shank B, secured by a nut, *b*, of a cylindrical yoke or socket, C, which is divided at *c* on one side, and provided with ears D D′, through which is a screw-bolt, E, the screw-threaded portion tapped into the lower ear D′, so as to enable the lips of the divided side to be closed, and to thus firmly gripe the tubular stem F of the rear cheek G, which is made correspondingly cylindrical.

Fitted snugly within the cylindrical interior of the stem F is the stem H of the front cheek I, which stem is likewise tubular, to receive the main screw J and spiral spring K. The stem H is slotted, as at *h*, to permit it to slide longitudinally over a stationary nut, L, which is attached to, and projects within, the stem F, as seen in Fig. 3. Into this nut the screw J is turned, passing through and bearing upon the front cheek, with a spiral spring, K, within the tubular portion of the front cheek, in substantially the usual manner for this class of vises.

M M′ are the principal jaws, and from these the cheeks are prolonged to the opposite side of the stems in the form of jaws, and are represented as armed with V-formed or angular jaws N N′, for griping pipes and other round objects.

It will be seen that the two cheeks of this vise are susceptible of being vibrated bodily through about ninety degrees, or more, in a horizontal plane about the shank B, or of complete vertical rotation within the yoke C.

This arrangement enables the resting of one end of a pipe of any length in any convenient position upon the ground, while the other end is firmly and conveniently held in the vise; and it also enables the work to be presented in various convenient positions without being removed from the vise, and the nut *b* and screws E and J enable the cheeks to be securely held to any position of adjustment whatever.

The spiral spring K serves to hold the cheeks to any position of separation permitted by the main screw.

I do not propose to restrict the invention to the precise form here shown, the same being susceptible of various modifications; for example, the stem F and yoke C may be spherical instead of cylindrical at their place of contact, the yoke being parted on both sides and secured by two bolts.

I claim—

1. A bench-vise consisting of a pair of jaws, and a screw for adjusting such jaws relatively to each other, the said jaws arranged and combined with a socket, and adjustable within said socket in a vertical plane around a horizontal axis of which the screw is substantially the center, and substantially as described.

2. A bench-vise adjustable around two centers at right angles to each other, substantially as set forth.

3. The arrangement of cheeks G and I with tubular stems F and H, capable of being slid one within the other and secured within the divided yoke C, vibrating about a vertical stem, B, in combination with the nut *b* and screws E and J, for regulating and fixing the adjustments.

CHAS. BARNES.

Witnesses:
GEO. J. MURRAY,
WM. A. MCCALL.